US012272900B2

(12) United States Patent
Yang et al.

(10) Patent No.: US 12,272,900 B2
(45) Date of Patent: Apr. 8, 2025

(54) CONNECTOR ASSEMBLY DEVICE

(71) Applicants: Tyco Electronics (Shanghai) Co., Ltd., Shanghai (CN); TE Connectivity Services GmbH, Schaffhausen (CH)

(72) Inventors: An (Joshua) Yang, Shanghai (CN); Lvhai (Samuel) Hu, Shanghai (CN); Roberto Francisco-Yi Lu, Bellevue, WA (US)

(73) Assignees: Tyco Electronics (Shanghai) Co., Ltd., Shanghai (CN); TE Connectivity Solutions GmbH, Schaffhausen (CH)

( * ) Notice: Subject to any disclaimer, the term of this patent is extended or adjusted under 35 U.S.C. 154(b) by 378 days.

(21) Appl. No.: 17/956,092

(22) Filed: Sep. 29, 2022

(65) Prior Publication Data

US 2023/0096164 A1 Mar. 30, 2023

(30) Foreign Application Priority Data

Sep. 29, 2021 (CN) .......................... 202111155131.3

(51) Int. Cl.
*H01R 13/58* (2006.01)
*H01R 43/048* (2006.01)

(52) U.S. Cl.
CPC ....... *H01R 13/5812* (2013.01); *H01R 43/048* (2013.01)

(58) Field of Classification Search
CPC ............ H01R 13/5812; H01R 13/5825; H01R 43/048
USPC .......................................................... 439/460
See application file for complete search history.

(56) References Cited

U.S. PATENT DOCUMENTS

| | | | | | |
|---|---|---|---|---|---|
| 5,774,981 | A * | 7/1998 | Maejima | H01R 43/20 29/33 M | |
| 9,800,009 | B2 * | 10/2017 | Stull | H01R 43/048 | |
| 10,090,627 | B2 * | 10/2018 | Stull | H01R 43/058 | |
| 2008/0256792 | A1 * | 10/2008 | Imai | H01R 43/20 29/748 | |

FOREIGN PATENT DOCUMENTS

| | | | | | |
|---|---|---|---|---|---|
| CN | 109149316 | A * | 1/2019 | H01R 43/048 | |
| CN | 109217064 | B * | 7/2021 | H01R 43/00 | |
| DE | 102014006604 | A1 * | 11/2014 | H01R 43/048 | |

* cited by examiner

*Primary Examiner* — Peter G Leigh
(74) *Attorney, Agent, or Firm* — Barley Snyder

(57) ABSTRACT

A connector assembly device includes a terminal clamping device clamping and fixing a terminal of a connector and an insertion module. The insertion module includes a housing clamping device clamping and fixing a housing of the connector, a terminal guide device having a conical guide hole guiding the terminal into the housing, and a linear moving device driving the housing clamping device and the terminal guide device to move towards the terminal. The terminal is inserted into the housing through the conical guide hole.

20 Claims, 9 Drawing Sheets

CONNECTOR ASSEMBLY DEVICE

CROSS-REFERENCE TO RELATED APPLICATION

This application claims the benefit of the filing date under 35 U.S.C. § 119(a)-(d) of Chinese Patent Application No. 202111155131.3, filed on Sep. 29, 2021.

FIELD OF THE INVENTION

The present invention relates to an assembly device and, more particularly, to a connector assembly device.

BACKGROUND

Connectors are commonly used to realize an electrical connection between cables. The connector is usually preassembled on the end of the cable. In the prior art, the terminal of the connector is first crimped to the end of the cable, and then the terminal is inserted into the housing of the connector. However, in the prior art, the terminal is inserted into the housing manually, so the installation efficiency is very low. The terminal is also easily shaken during insertion, which reduces the assembly quality of the connector, and can sometimes damage the terminal or housing.

SUMMARY

A connector assembly device includes a terminal clamping device clamping and fixing a terminal of a connector and an insertion module. The insertion module includes a housing clamping device clamping and fixing a housing of the connector, a terminal guide device having a conical guide hole guiding the terminal into the housing, and a linear moving device driving the housing clamping device and the terminal guide device to move towards the terminal. The terminal is inserted into the housing through the conical guide hole.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENTS

Figure 1:
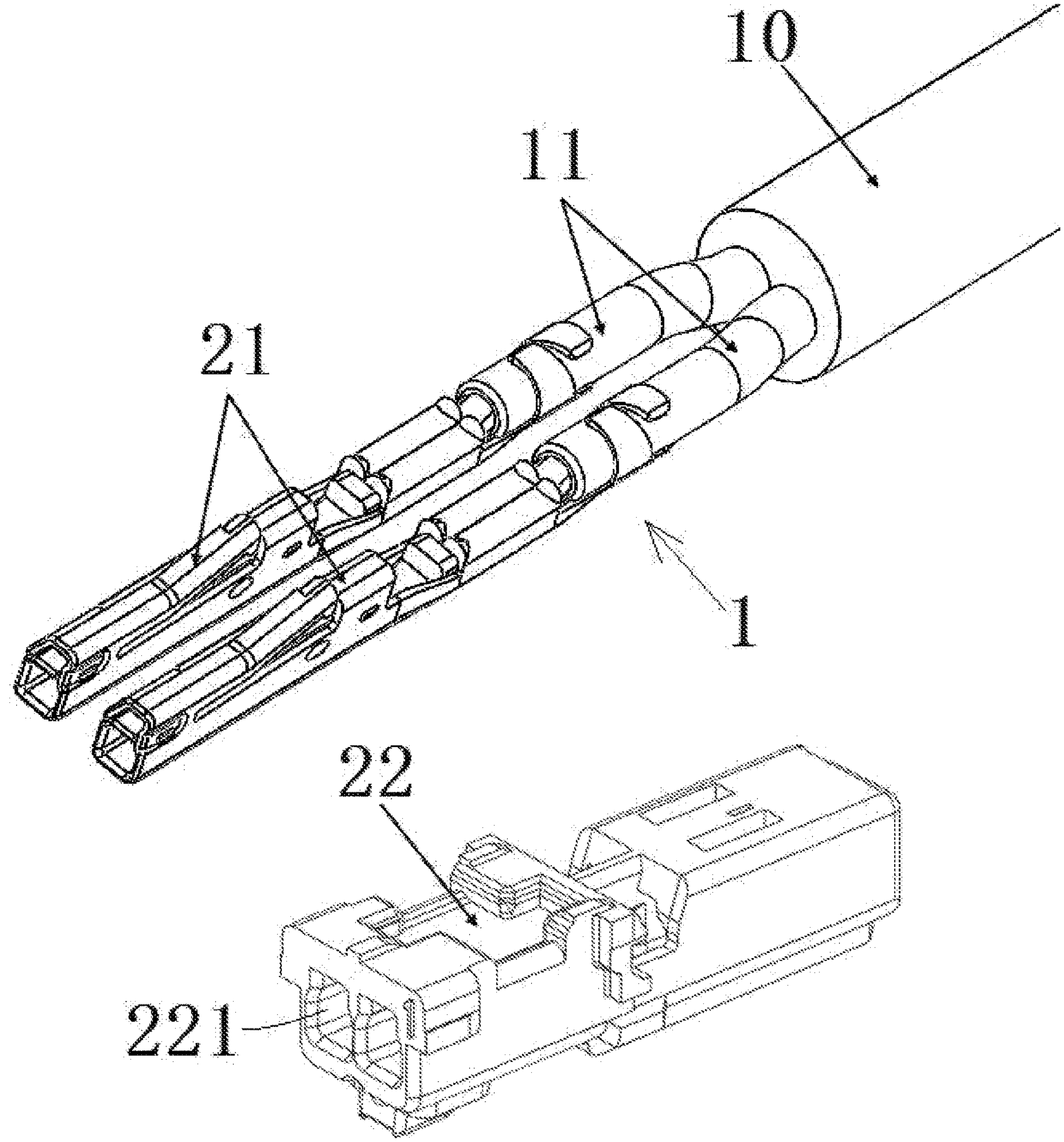
FIG. 1 is a perspective view of a cable, a terminal, and a housing of a connector according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
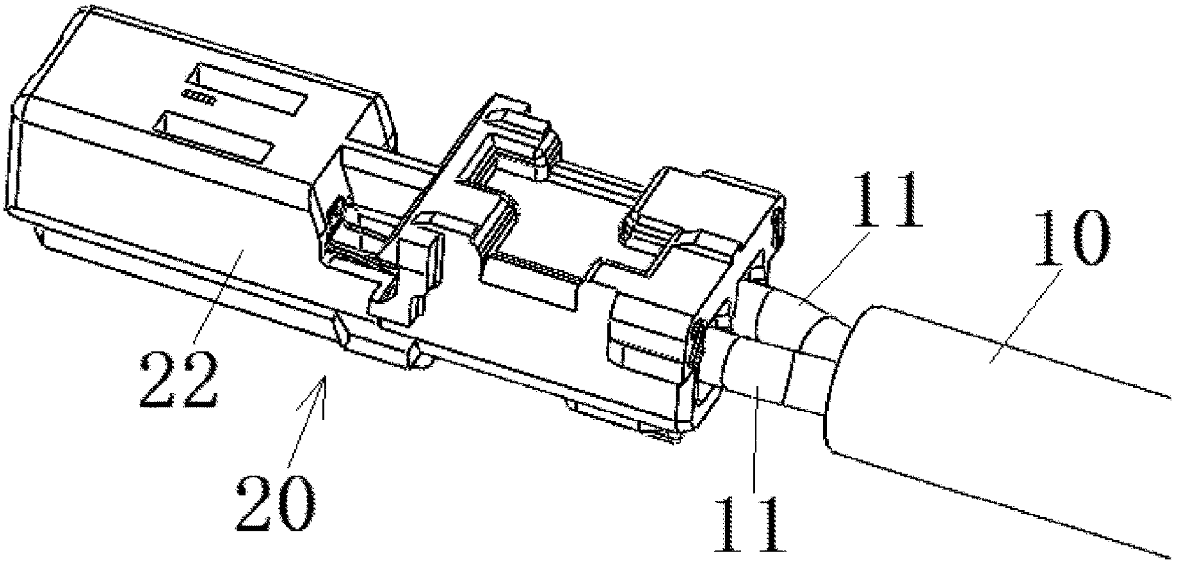
FIG. 2 is a perspective view of the connector in which the terminal has been inserted into the housing.

FIG. 1 shows an illustrative perspective view of a cable 10, a terminal 21, and a housing 22 of a connector 20 according to an exemplary embodiment of the present invention, wherein the terminal 21 has not been inserted into the housing 22; FIG. 2 shows an illustrative perspective view of the cable 10, the terminal 21, and the housing 22 of and the connector 20 according to an exemplary embodiment of the present invention, in which the terminal 21 has been inserted into the housing 22.

As shown in FIG. 1, in the illustrated embodiment, before inserting the terminal 21 into the housing 22, the terminal 21 has been crimped to the end of the core wire 11 of the cable 10, so that the cable 10 and the terminal 21 are assembled into a cable assembly 1. Then the terminal 21 of the cable assembly 1 is inserted into the housing 22, as shown in FIG. 2.

Figure 3:
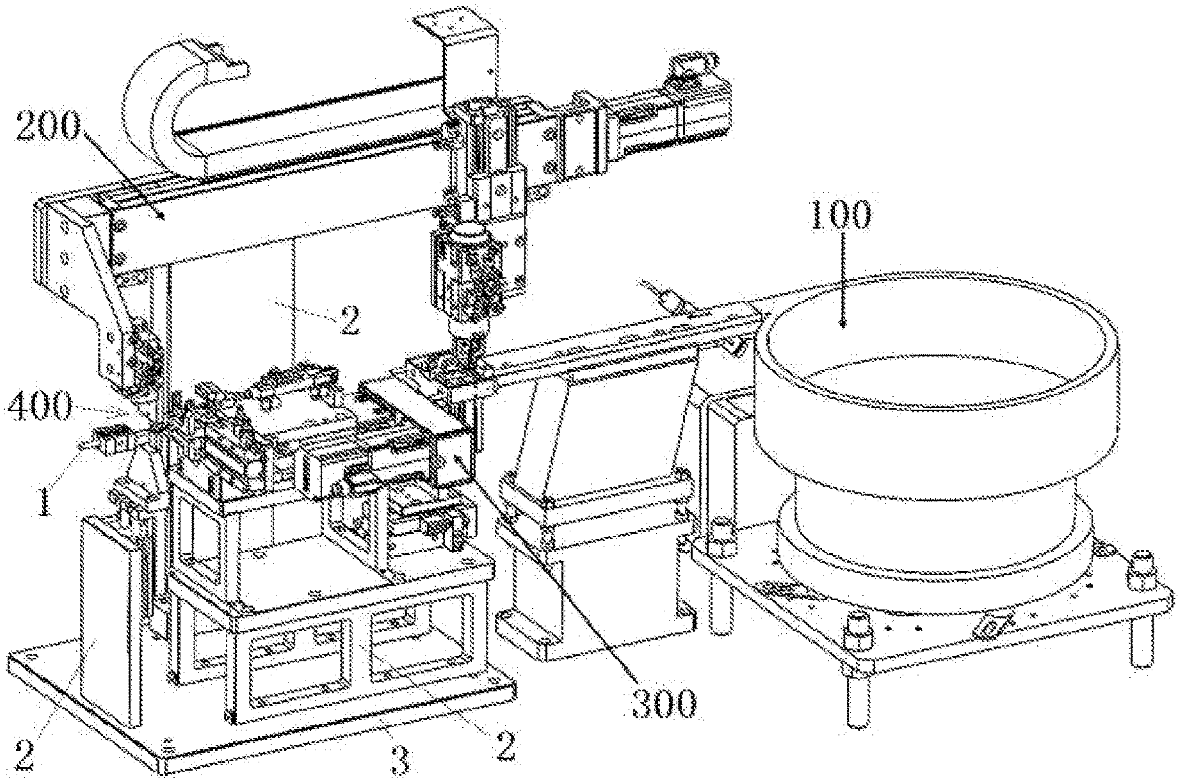
FIG. 3 is a perspective view of a connector assembly device according to an embodiment for assembling the terminal and the housing.

FIG. 3 shows an illustrative perspective view of a connector assembly device for assembling the terminal 21 and the housing 22 of the connector 20 shown in FIG. 1 according to an exemplary embodiment of the present invention. The connector assembly device is used to insert the terminal 21 of the cable assembly 1 into the housing 22.

Figure 6:
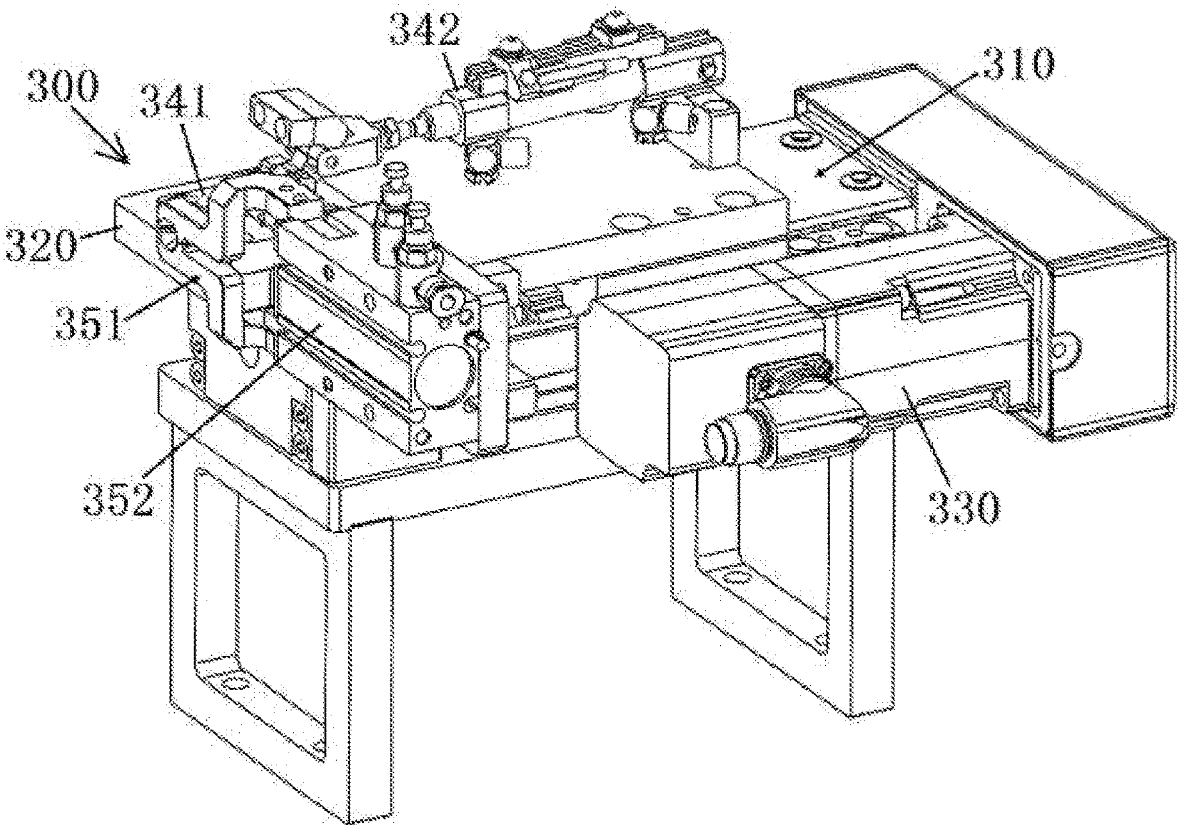
FIG. 6 is a perspective view of an insertion module of the connector assembly from a side.
Figure 7:
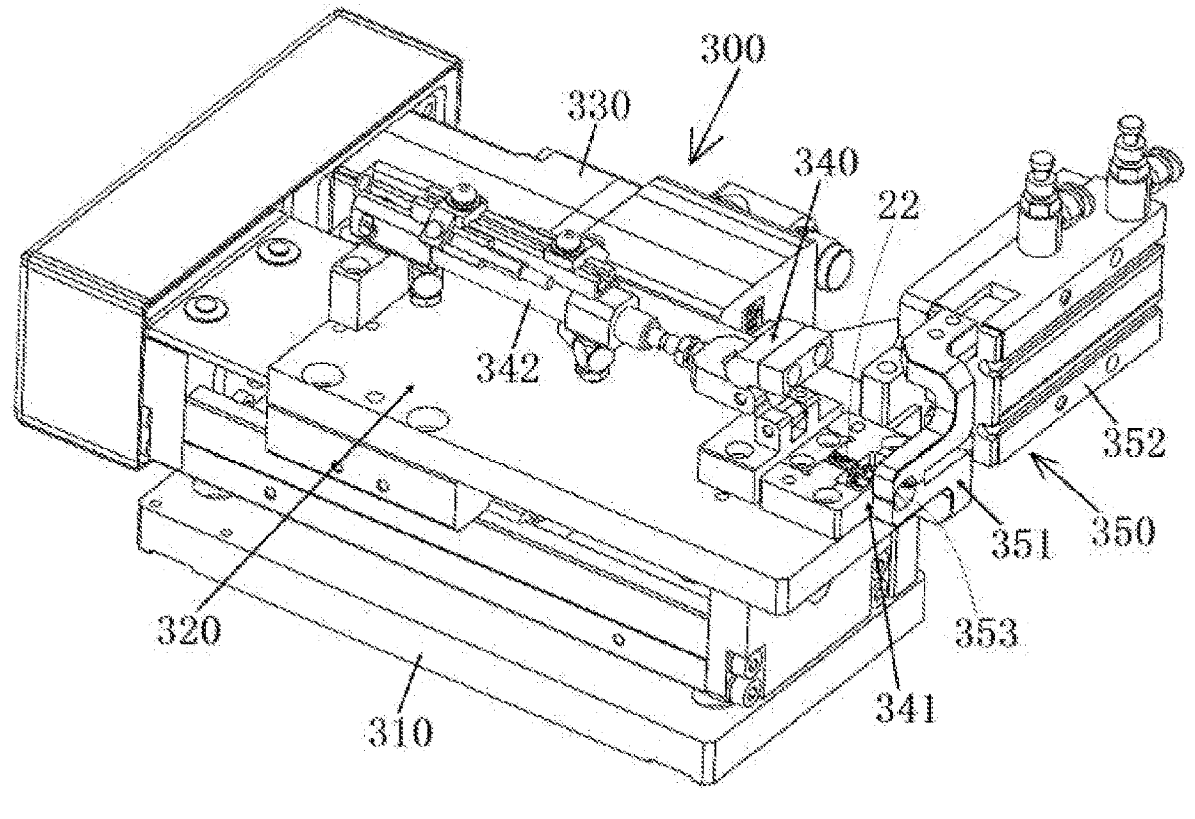
FIG. 7 is a perspective view of the insertion module from another side.
Figure 8:
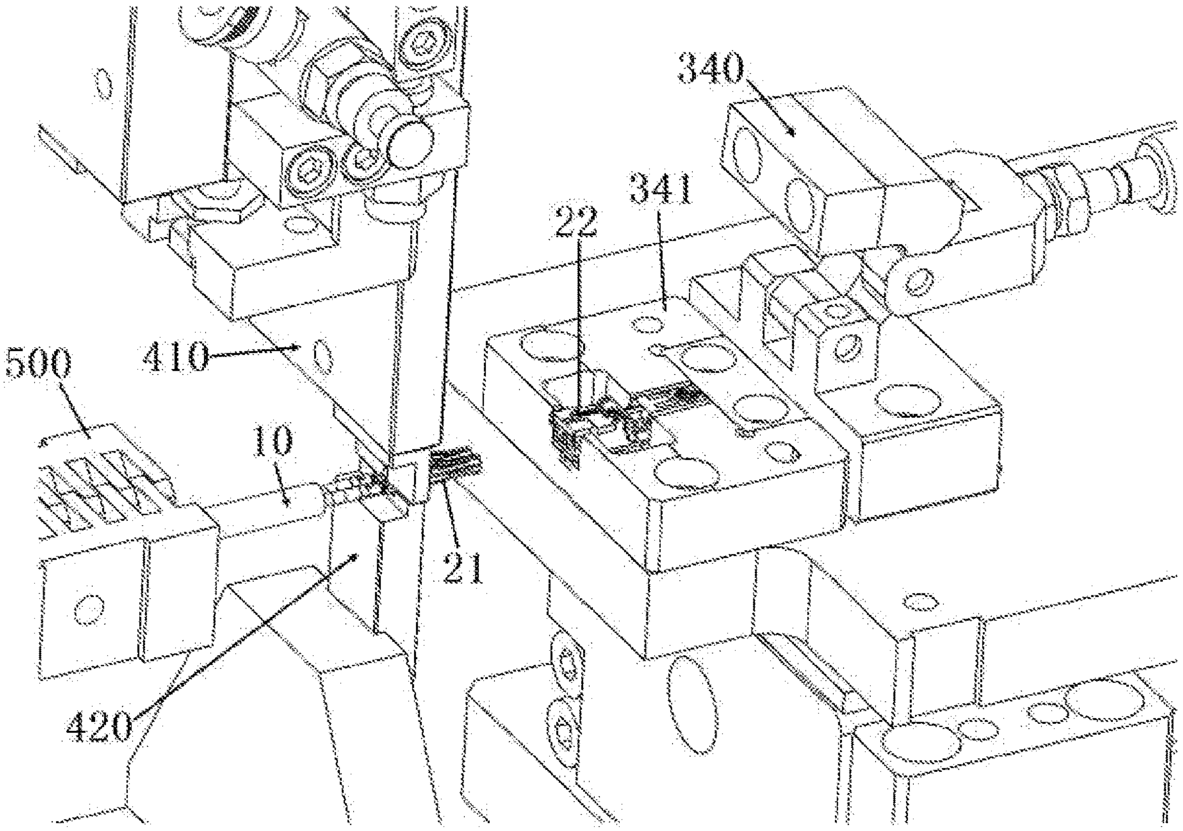
FIG. 8 is a schematic diagram of the connector assembly device with the terminal and the housing.
Figure 9:
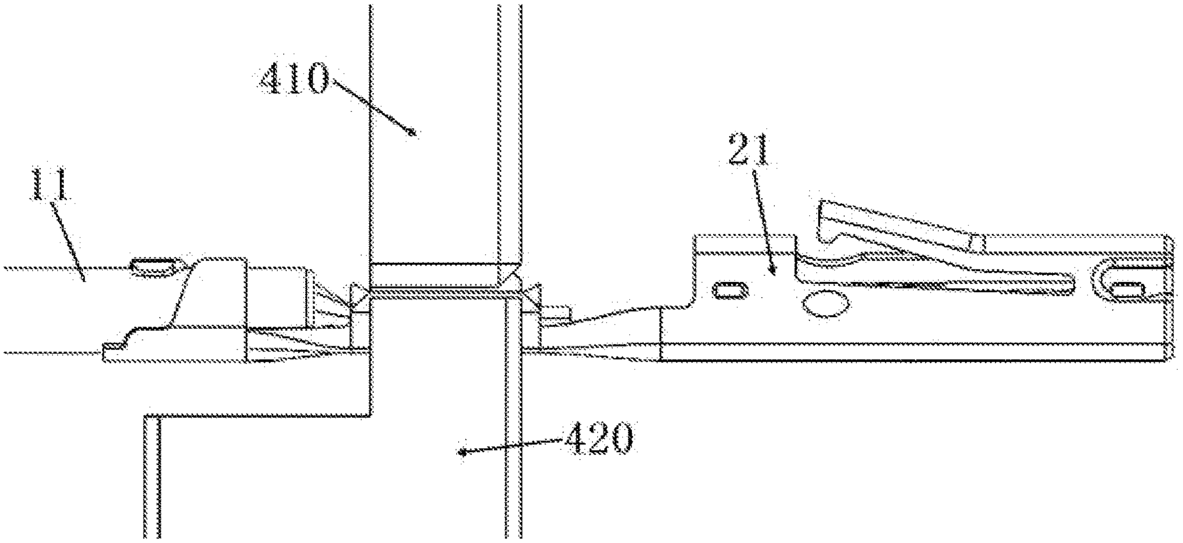
FIG. 9 is a schematic diagram of a terminal clamping device.
Figure 10:
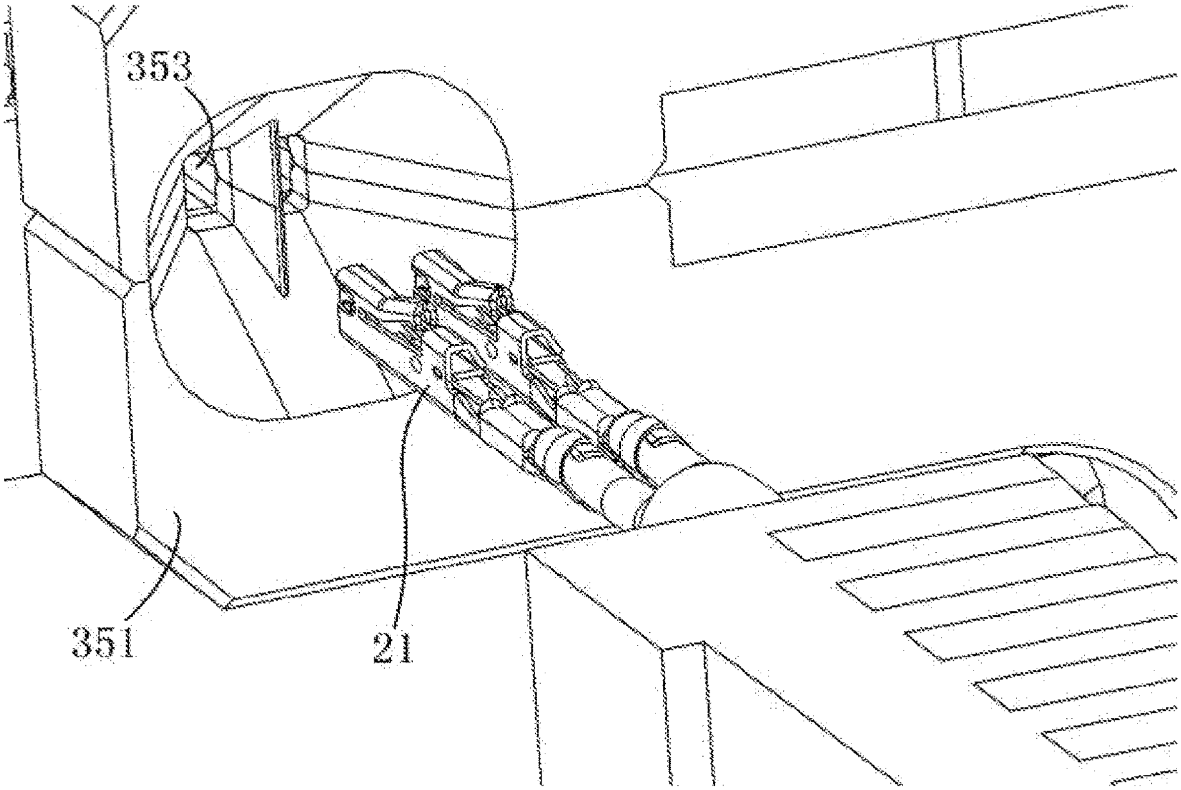
FIG. 10 is a schematic diagram of a terminal guide device of the insertion module.

FIG. 6 shows an illustrative perspective view of an insertion module 300 of the connector assembly device shown in FIG. 3 when viewed from one side. FIG. 7 shows an illustrative perspective view of the insertion module 300 of the connector assembly device shown in FIG. 3 when viewed from the other side. FIG. 8 shows a partially enlarged schematic diagram of the connector assembly device shown in FIG. 3, in which the clamped terminal 21 and housing 22 are shown. FIG. 9 shows a schematic diagram of a terminal clamping device 400 for clamping the terminal 21 in FIG. 8. FIG. 10 shows a partially enlarged schematic diagram of a terminal guide device 350 of the insertion module 300 shown in FIG. 6 or FIG. 7, in which a conical guide hole 353 is shown.

As shown in FIG. 3, in the illustrated embodiment, the connector assembly device includes the insertion module 300 and a terminal clamping device 400. The terminal clamping device 400 is suitable for clamping and fixing the terminal 21 of the connector 20 so that the terminal 21 is fixed at a predetermined position, as shown in FIG. 8.

As shown in FIG. 7, in the illustrated embodiment, the insertion module 300 includes: a housing clamping device 340, a terminal guide device 350, and a linear moving device 310, 320, 330. The housing clamping device 340 is suitable for clamping and fixing the housing 22 of the connector. The terminal guide device 350 has a conical guide hole 353 suitable for guiding the guide terminal 21 into the housing 22. The linear moving device 310, 320, 330 is adapted to drive the housing clamping device 340 and the terminal guide device 350 to move towards the terminal 21 so that the terminal 21 is inserted into the housing 22 through the conical guide hole 353.

As shown in FIGS. 6 and 7, in the illustrated embodiment, the linear moving device 310, 320, 330 includes a fixed frame 310, a moving plate 320, and a driving device 330. The moving plate 320 is movably mounted on the fixed frame 310 and can move in a linear direction. The driving device 330 is installed on the fixed frame 310 to drive the moving plate 320 to move in the linear direction. The housing clamping device 340 and the terminal guide device 350 are mounted on the moving plate 320 so that they can move in the linear direction with the moving plate 320.

As shown in FIGS. 6 and 7, in the illustrated embodiment, the terminal guide device 350 includes a guide fixture 351 and a first driver 352. The guide fixture 351 can be opened and closed. The first driver 352 is mounted on the moving plate 320 to drive the guide fixture 351 to open and close. The guide fixture 351 includes a pair of clamping arms, and a semi conical guide hole is formed on each clamping arm. When the pair of clamping arms of the guide fixture 351 are closed, the semi conical guide holes on the pair of clamping arms are combined into a complete conical guide hole 353.

As shown in FIG. 1, a terminal hole 221 corresponding to the terminal 21 is formed on the housing 22, and the terminal 21 is adapted to be inserted into the terminal hole 221. The larger diameter opening of the conical guide hole 353, shown in FIG. 7, faces and aligns with the terminal 21, and the smaller diameter opening of the conical guide hole 353 faces and aligns with the terminal hole 221.

The terminal clamping device 400 is suitable for clamping and fixing a plurality of terminals 21 at the same time, and a plurality of conical guide holes 353 are formed on the terminal guide device 350 for guiding the plurality of terminals 21 to be inserted into the housing 22 at the same time.

As shown in FIG. 1, the cable 10 includes two core wires 11, the connector 20 includes two terminals 21, and the two terminals 21 are crimped on the two core wires 11 respectively. The housing 22 of the connector 20 has two terminal holes 221, and the connector assembly device is used to insert the two terminals 21 into the two terminal holes 221 of the housing 22 at the same time.

As shown in FIG. 6, in the illustrated embodiment, the housing clamping device 340 includes a housing fixture 341 and a second driver 342. The housing fixture 341 can be closed or opened to clamp or release the housing 22. The second driver 342 is mounted on the moving plate 320 to drive the housing fixture 341 to open and close.

As shown in FIGS. 8 and 9, the terminal clamping device 400 includes a first clamping block 410 and a second clamping block 420. The first clamping block 410 and the second clamping block 420 can be moved to a closed position close to each other or an open position away from each other to clamp or release the terminal 21.

The conical guide hole 353, shown in FIG. 10, is used to guide the terminal 21 to be pre-inserted into the housing 22. After the terminal 21 is pre-inserted into the housing 22, the terminal clamping device 400 releases the terminal 21 and opens the guide fixture 351 to allow the terminal 21 to be fully inserted into the housing 22.

Figure 4:
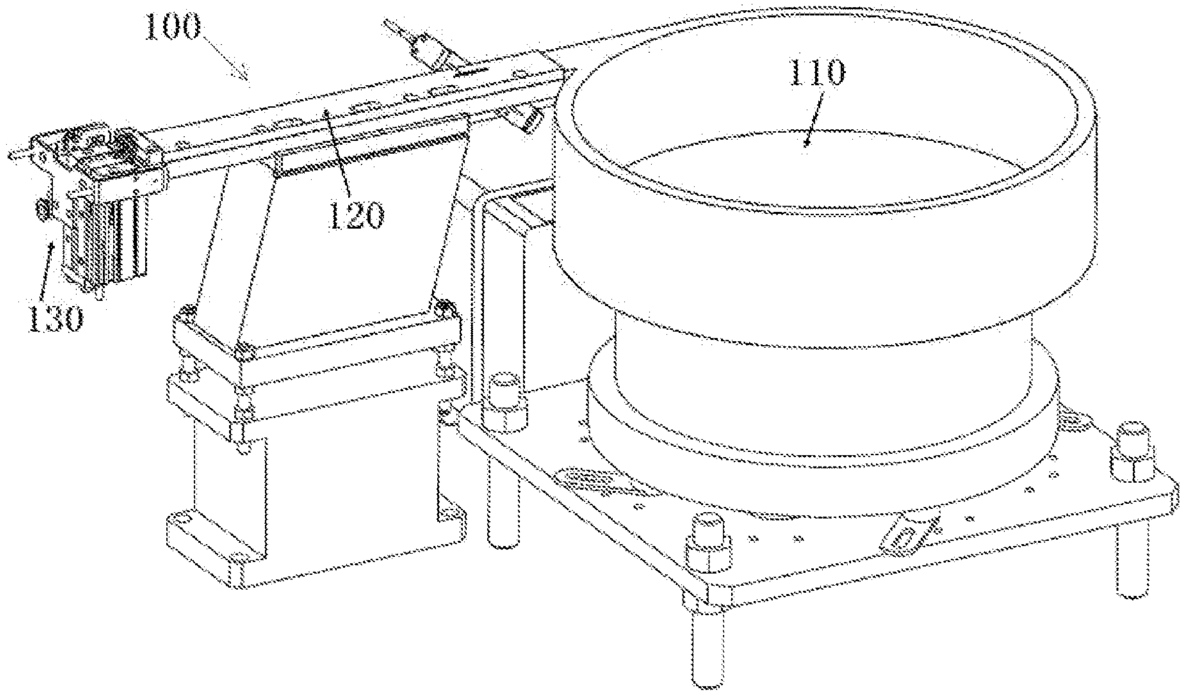
FIG. 4 is a perspective view of a housing supply device of the connector assembly device.

FIG. 4 shows an illustrative perspective view of the housing supply device 100 of the connector assembly device shown in FIG. 3, the housing supply device 100 supplies the housing 22 to be assembled to the insertion module 300. The housing supply device 100 includes a bowl vibration feeder 110 and a linear vibration feeder 120. The bowl vibration feeder 110 is adapted to drive the housing 22 to move towards its outlet by vibration. The linear vibration feeder 120 comprises a linear feeding channel connected with the outlet of the bowl vibration feeder 110 and is suitable for conveying the housing 22 forward along its linear feeding channel through the vibration.

As shown in FIGS. 3 and 4, in the illustrated embodiment, the housing supply device 100 also includes a blocking device 130. The blocking device 130 is arranged on the linear vibration feeder 120 to block the housing 22 at a predetermined position of the linear feeding channel of the linear vibration feeder 120, for example, at the outlet of the linear feeding channel.

Figure 5:
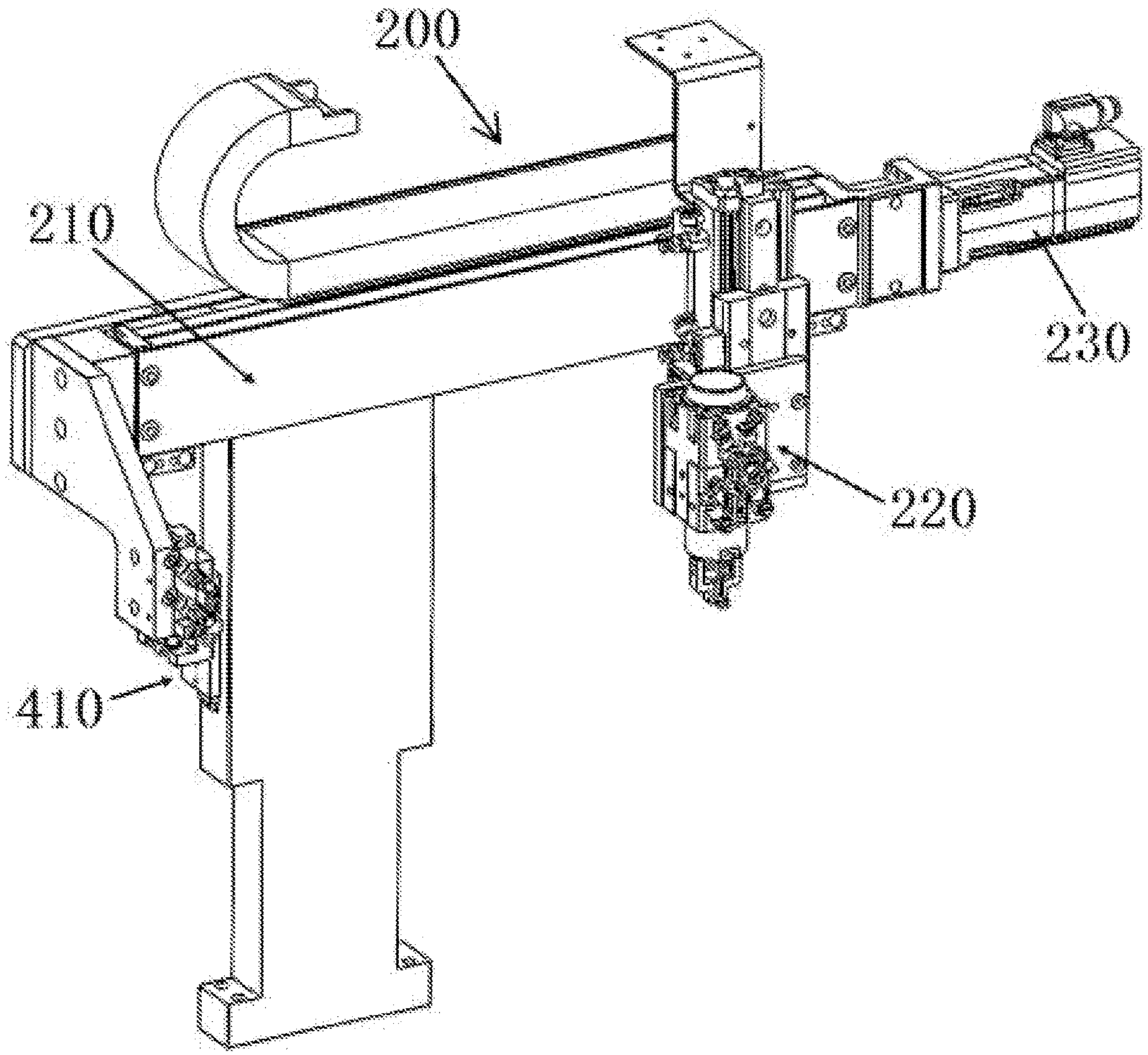
FIG. 5 is a perspective view of a housing loading device of the connector assembly device.

As shown in FIGS. 3 and 5, in the illustrated embodiment, the connector assembly device also includes a housing loading device 200. The housing loading device 200 is adapted to grasp the housing 22 to be assembled and place the grabbed housing 22 on the housing fixture 341.

As shown in FIG. 5, in the illustrated embodiment, the housing loading device 200 includes a support frame 210, a gripper 220, and a third driver 230. The gripper 220 is movably mounted on the support frame 210 and can be moved along a straight line. The third driver 230 is mounted on the support frame 210 to drive the gripper 220 to move in the straight line.

As shown in FIG. 8, the connector assembly device also includes a cable clamping device 500 for clamping and fixing the cable 10 of the cable assembly 1 shown in FIG. 1. After the terminal 21 is fully inserted into the housing 22, the cable clamping device 500 releases the cable 10, and the housing clamping device 340 releases the housing 22. At this time, the assembled connector 20 can be removed.

As shown in FIG. 3, in the illustrated embodiment, the connector assembly device also includes a frame 2 and a base 3. The frame 2 is fixed on the base 3, and the aforementioned insertion module 300, terminal clamping device 400 and cable clamping device 500 are installed on the frame 2.

In the above exemplary embodiments according to the present invention, the automatic assembly of the connector can be realized, and the assembly efficiency of the connector is improved. In addition, in the present invention, the terminal guide device can guide the terminal to be inserted into the housing accurately, which improves the assembly quality of the connector.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector assembly device, comprising:

a terminal clamping device clamping and fixing a terminal of a connector; and an insertion module including:

a housing clamping device clamping and fixing a housing of the connector;

a terminal guide device having a conical guide hole guiding the terminal into the housing; and a linear moving device driving the housing clamping device and the terminal guide device to move towards the terminal so that the terminal is inserted into the housing through the conical guide hole.

2. The connector assembly device of claim 1, wherein the linear moving device includes:

a fixed frame;

a moving plate movably mounted on the fixed frame and movable in a linear direction; and a driving device mounted on the fixed frame for driving the moving plate to move along the linear direction, the housing clamping device and the terminal guide device are installed on the moving plate to move along the linear direction with the moving plate.

3. The connector assembly device of claim 2, wherein the terminal guide device includes:

a guide fixture capable of being opened and closed; and a first driver mounted on the moving plate for driving the guide fixture to open and close, when the guide fixture is closed, the conical guide hole is formed on the guide fixture.

4. The connector assembly device of claim 1, wherein a terminal hole corresponding to the terminal is formed on the housing, the terminal is inserted into the terminal hole.

5. The connector assembly device of claim 4, wherein a larger diameter opening of the conical guide hole faces and is aligned with the terminal, a smaller diameter opening of the conical guide hole faces and aligns with the terminal hole.

6. The connector assembly device of claim 1, wherein the terminal is one of a plurality of terminals, the terminal clamping device simultaneously clamps and fixes the plurality of terminals, the conical guide hole is one of a plurality of conical guide holes formed on the terminal guide device simultaneously guiding the plurality of terminals into the housing.

7. The connector assembly device of claim 2, wherein the housing clamping device includes:

a housing fixture capable of being closed or opened to clamp or release the housing; and a second driver installed on the moving plate and driving the housing fixture to open and close.

8. The connector assembly device of claim 3, wherein the terminal clamping device includes a first clamping block and a second clamping block movable to a closed position close to each other or an open position away from each other to clamp or release the terminal.

9. The connector assembly device of claim 8, wherein the conical guide hole guides the terminal to be pre-inserted into the housing.

10. The connector assembly device of claim 9, wherein, after the terminal is pre-inserted into the housing, the terminal clamping device releases the terminal and opens the guide fixture to allow the terminal to be fully inserted into the housing.

11. The connector assembly device of claim 1, further comprising a housing supply device supplying the housing to the insertion module.

12. The connector assembly device of claim 11, wherein the housing supply device includes:

a bowl vibration feeder driving the housing to move towards an outlet by vibration; and a linear vibration feeder having a linear feeding channel connected with the outlet of the bowl vibration feeder and driving the housing to move forward along the linear feeding channel by vibration.

13. The connector assembly device of claim 12, wherein the housing supply device has a blocking device provided on the linear vibration feeder to block the housing at a predetermined position.

14. The connector assembly device of claim 7, further comprising a housing loading device grasping the housing and placing the housing on the housing fixture.

15. The connector assembly device of claim 14, wherein the housing loading device includes:

a support frame;

a gripper movably installed on the support frame and movable along a straight line; and a third driver installed on the support frame and driving the gripper to move along the straight line.

16. The connector assembly device of claim 1, wherein, before being clamped on the terminal clamping device, the terminal is pre-crimped to a core wire of a cable to form a cable assembly.

17. The connector assembly device of claim 16, further comprising a cable clamping device clamping and fixing the cable.

18. The connector assembly device of claim 17, wherein the core wire is one of a pair of core wires of the cable, the terminal is one of a pair of terminals of the connector, and the terminals are crimped on the core wires.

19. The connector assembly device of claim 18, wherein the housing has a pair of terminal holes, the terminals are simultaneously inserted into the terminal holes of the housing.

20. The connector assembly device of claim 17, further comprising a base and a frame fixed on the base, the insertion module, the terminal clamping device, and the cable clamping device are installed on the frame.

* * * * *